W. H. STUART.
Seed Planter.
No. 25,685.
Patented Oct. 4, 1859.
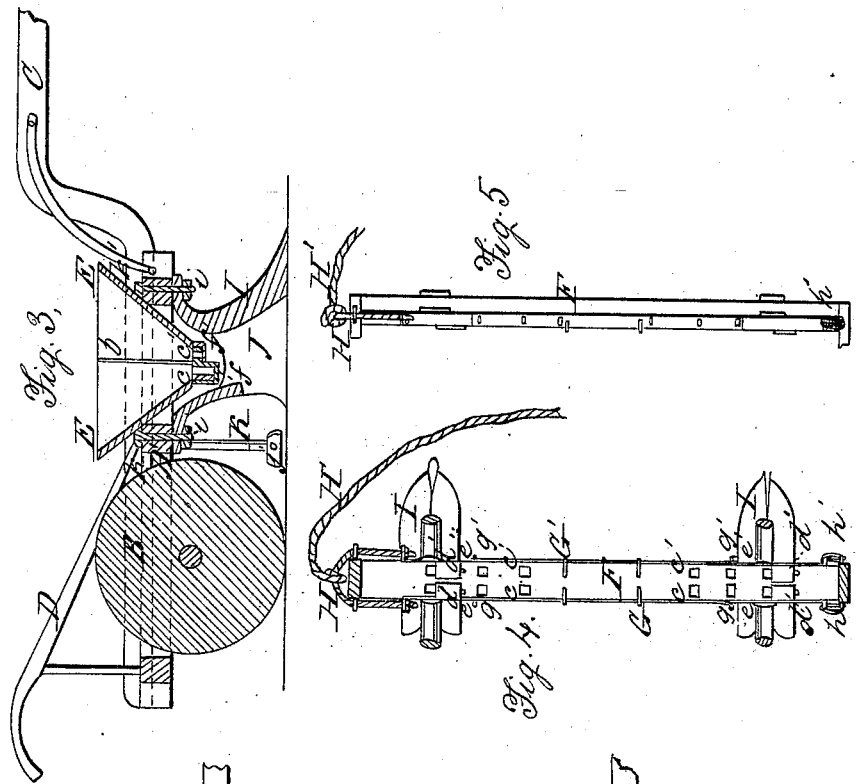
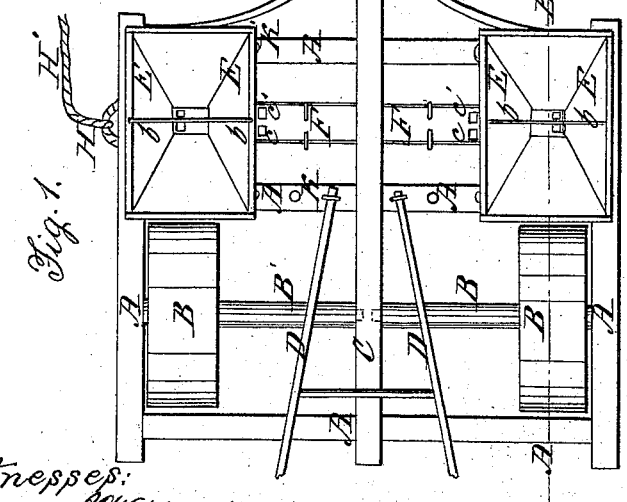
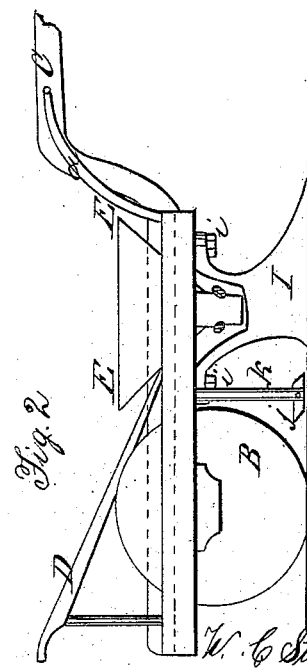
Witnesses:
Inventor:
W. C. Stuart
By His Attorney,
Thos. H. Dodge

UNITED STATES PATENT OFFICE.

W. H. STUART, OF MILLINGTON, MARYLAND.

IMPROVEMENT IN SEED-PLANTERS.

Specification forming part of Letters Patent No. 25,685, dated October 4, 1859.

*To all whom it may concern:*

Be it known that I, W. H. STUART, of Millington, in the county of Kent, in the State of Maryland, have invented certain new and useful Improvements in Corn-Planters; and I do hereby declare that the following is a sufficiently clear and exact description thereof to enable those skilled in the art to make and use my said improvements, reference being had to the accompanying drawings, and to the letters of reference marked thereon, forming a part of this specification.

In the accompanying drawings, Figure 1 is a plan view of my improved planter. Fig. 2 is a side view of the same. Fig. 3 is a section in line A B, Fig. 1. Fig. 4 is a plan view of the gage-bar with the seed-boxes removed, and Fig. 5 is a front view of the same.

A rectangular frame, A, is supported on two independent wheels, B B, while the machine is drawn forward by means of a central draft-pole, C, and is steadied in its course by the hand-levers D. The draft-pole C is curved up, as shown in Figs. 2 and 3, and is braced by bars $a$.

Two seed-boxes, E, one on each side, are used. Those boxes are fastened in front to the front timber of the main frame and in rear to the central timber, A', and are also divided by central partitions, $b$.

Directly under the seed-boxes is the gage-box F, which is provided with two series of openings or chambers, $c\ c'$. These openings or chambers extend down through the gage-bar F, and are closed on the top by sliding valves $d\ d'$, attached to slides $e\ e'$, and on the bottom by similar valves, $f\ f'$, attached to the slides $d\ d'$. The valves $d\ d'$ and $f\ f'$ are so attached to their respective slides that when the valves on top are closed those on the bottom will be open. The slides $e\ e'$ on one side are connected to the corresponding slides on the other side by means of pins or hooks $g\ g'$, taking into holes in the plates G G'. The slides $e\ e'$ are connected to one side of the frame by means of springs $h\ h'$, and at the other end by a rope, H, or its equivalent, while a second rope, H', or its equivalent, is attached to the rope H. (See Figs. 1, 4, and 5.)

Under each of the seed-boxes E is an earth-opener, I, of peculiar construction, and which is fastened to the front of the main frame and to the central piece, A', as shown in Figs. 2 and 3, by bolts $i\ i$. The opener I is hollow, and is open in rear, as seen at J, Fig. 3.

In rear of each of the openers I are two coverers, K K, so attached to the main frame or central piece, A', that their shovel ends $j$ can be set at any desired angle.

The front timber of the main frame and the central piece, A', are both provided with a series of holes, $k\ k'$, so that the openers I, together with the whole of the planting apparatus, can be quickly adjusted to plant two rows of corn at a greater or less distance apart, the slides and valves being adjusted in a corresponding degree, as before stated.

The wheels B B, in addition to being supporting-wheels, also act as covering-wheels, and are arranged on separate shafts B' B', so that they can be moved nearer to or farther from each other, while at the same time they can turn independently on their axles.

To operate my improved corn-planter, the necessary quantity of corn being placed in the rear divisions of the seed-boxes E and any kind of fertilizer in the front divisions, the machine is drawn forward over the ground previously furrowed, the motion of the machine being at right angles to the furrows. One attendant steadies the machine by the handles D D, while another takes hold of the rope or chain H' and walks along by the side of the machine, and when the openings $c\ c'$ in the gage-bar F are directly over the furrow, he pulls the slides $e\ e'$, which opens the lower valves and closes the upper ones, and by which operation the seed in the chamber $c$, together with the fertilizing substance in the chamber $c'$, are both deposited together in the furrow, two rows being planted evenly and at the same time. As soon as the machine passes the furrow the rope H is loosened and the springs $h\ h'$ close the valves below the gage-plate F, while those on top are opened, so as to permit a fresh supply of seed and fertilizing material to enter the chambers $c\ c'$ for the next hills. The openers I are of such construction as to prevent the wind from blowing away the seed or fertilizing material before they are fairly deposited in the ground. As the machine advances the shovel-ends $j$ of the coverers K completely cover the seed, while the wheels B B press down the earth on top of the same.

A great advantage of my mode of operating the valves is that the attendant can operate both at a time, or either one first, by different motions of his arm, and can thus sow different seed in each alternate hill by filling both divisions with seed, or he can first drop some fertilizing material and then corn and fertilizing material together.

By the mode of fastening the openers I in the rear and front, as fully shown in Figs. 2 and 3, they can be made quite light and yet be strong and rigid, while at the same time the frame of the machine is braced, and can consequently be made lighter. It will be understood that the corn can be placed in either division, and also that more than two divisions can be used in each box.

Having described my improved corn-planter, what I claim, and desire to secure by Letters Patent, is—

1. A double corn-planter the parts of which are constructed, combined, and arranged to operate in relation to each other as described.

2. Connecting the two independent sets of valves by means of the flexible connection H, in combination with the single operating chain or cord H', as and for the purposes set forth.

W. H. STUART.

Witnesses:
  JESSE K. HINES,
  JNO. N. McLAINE.